US006580032B2

(12) United States Patent
Sumida et al.

(10) Patent No.: US 6,580,032 B2
(45) Date of Patent: Jun. 17, 2003

(54) FUSE UNIT AND MANUFACTURING METHOD THEREFOR

(75) Inventors: Tatsuya Sumida, Yokkaichi (JP); Shunji Taga, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 10/051,361

(22) Filed: Jan. 22, 2002

(65) Prior Publication Data

US 2002/0058441 A1 May 16, 2002

Related U.S. Application Data

(62) Division of application No. 09/726,335, filed on Dec. 1, 2000.

(30) Foreign Application Priority Data

Dec. 3, 1999 (JP) .......................................... 11-345350

(51) Int. Cl.[7] ................................................ H02G 3/08

(52) U.S. Cl. .......................... 174/59; 174/50; 174/52.1; 337/227; 337/186

(58) Field of Search .......................... 174/50, 58, 17 R, 174/59, 52.1, 60, 65 R, 17.08; 337/227, 229, 256, 186, 187, 833, 837, 255, 159

(56) References Cited

U.S. PATENT DOCUMENTS

| | | | | | |
|---|---|---|---|---|---|
| 3,829,808 | A | * | 8/1974 | Blewitt et al. | 337/186 |
| 4,504,816 | A | | 3/1985 | Viola et al. | |
| 4,608,548 | A | | 8/1986 | Borzoni | |
| 4,672,352 | A | * | 6/1987 | Takano | 337/264 |
| 4,689,597 | A | | 8/1987 | Galloway et al. | |
| 4,884,050 | A | | 11/1989 | Kozel | |
| 4,958,426 | A | * | 9/1990 | Endo et al. | 29/623 |
| 5,171,293 | A | * | 12/1992 | Umemoto et al. | 337/194 |
| 5,293,147 | A | * | 3/1994 | Oh et al. | 337/227 |
| 5,629,663 | A | * | 5/1997 | Seki et al. | 337/186 |
| 5,631,620 | A | | 5/1997 | Totsuka et al. | |
| 5,645,448 | A | * | 7/1997 | Hill | 439/522 |
| 5,790,007 | A | | 8/1998 | Yasukuni | |
| 5,825,274 | A | * | 10/1998 | Totsuka | 337/227 |
| 5,883,562 | A | | 3/1999 | Matsuoka et al. | |
| 5,886,612 | A | * | 3/1999 | Beckert et al. | 337/186 |
| 5,977,859 | A | * | 11/1999 | Kawamura et al. | 29/623 |
| 6,011,458 | A | * | 1/2000 | Endo et al. | 337/185 |
| 6,144,283 | A | * | 11/2000 | Matsumura | 29/623 |
| 6,294,978 | B1 | * | 9/2001 | Endo et al. | 337/186 |

FOREIGN PATENT DOCUMENTS

| | | |
|---|---|---|
| DE | 19646264 | 5/1998 |
| JP | 5-299003 | 11/1993 |
| JP | 2000-30600 | 1/2000 |
| JP | 2000182506 | 6/2000 |
| WO | 164799 | 12/1985 |
| WO | 924734 | 6/1999 |

OTHER PUBLICATIONS

English Language Abstract for JP Appln. No. 2000–182506.
English Language Abstract of JP–5–299003.
English Language Abstract of JP–2000–30600.
English Language Abstract of JP–2000–182506.

* cited by examiner

*Primary Examiner*—Dean A. Reichard
*Assistant Examiner*—Angel R. Estrada
(74) *Attorney, Agent, or Firm*—Greenblum & Bernstein, P.L.C.

(57) ABSTRACT

An electrically conductive metal plate is stamped out to yield a fuse unit including an input terminal and several output terminals. The fuse unit further includes a predetermined locus where fuse element portions are to be formed later. A surface area of the fuse unit including the predetermined locus is then molded with an insulator material. Thereafter, the fuse element portions are formed at the predetermined locus by, for example, stamping. In this manner, the fuse unit can be manufactured easily at low costs, irrespective of the number and electrical capacity of the fuse element portions.

2 Claims, 8 Drawing Sheets

FIG.2 (a)
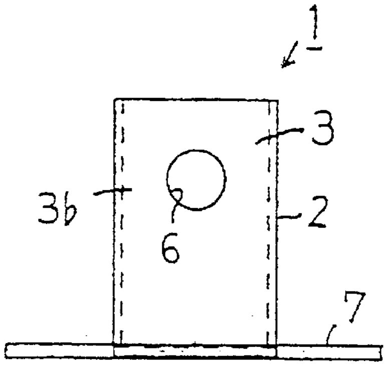
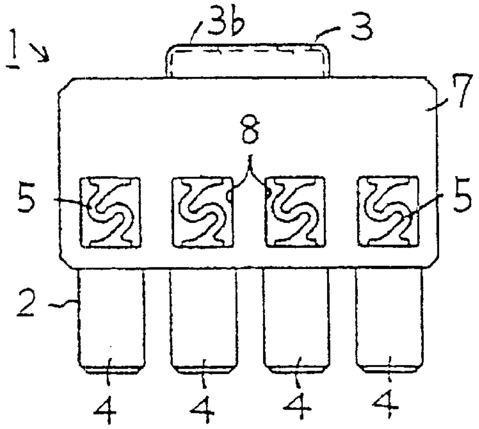
FIG.2 (b)
FIG.2 (c)
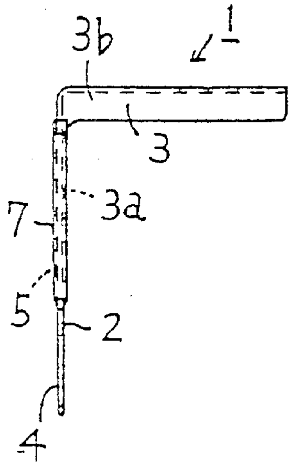
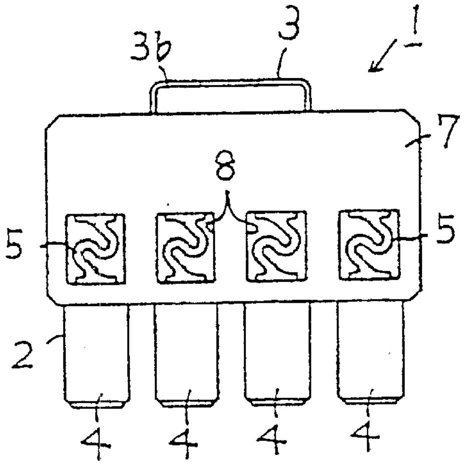
FIG.2 (d)

FIG.4 (a)
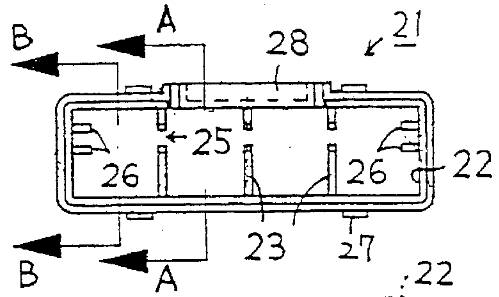
FIG.4 (b)
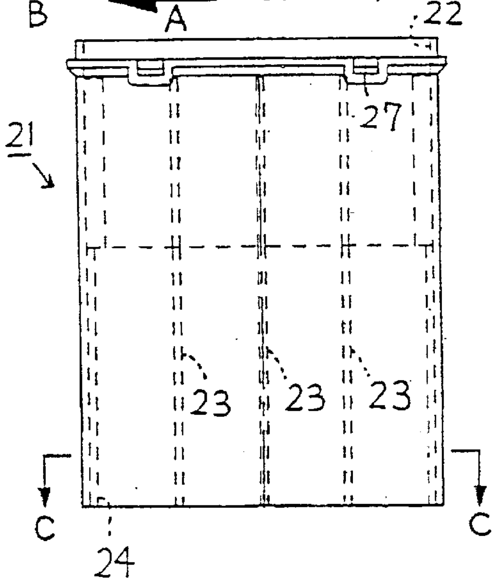
FIG.4 (c)
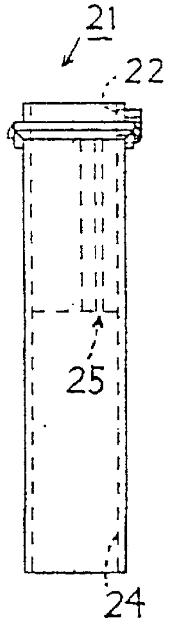
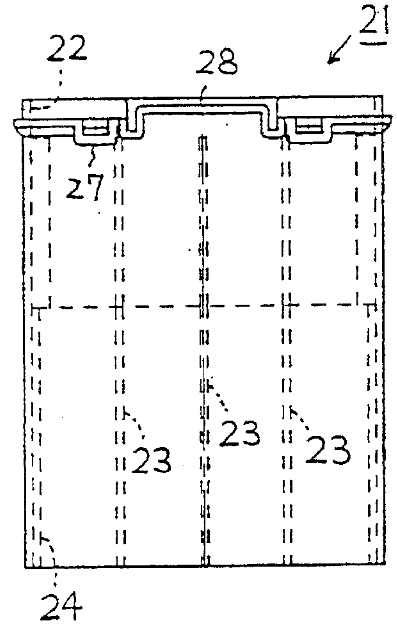
FIG.4 (d)

FIG.6 (d)
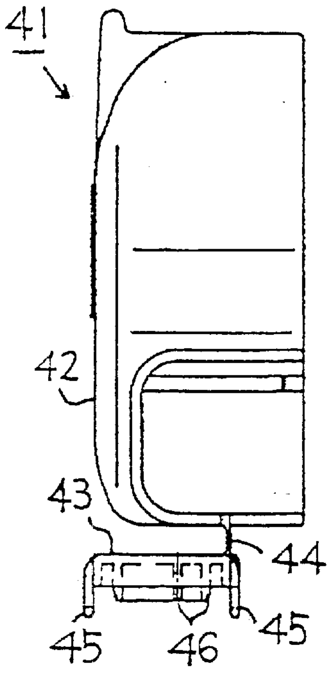
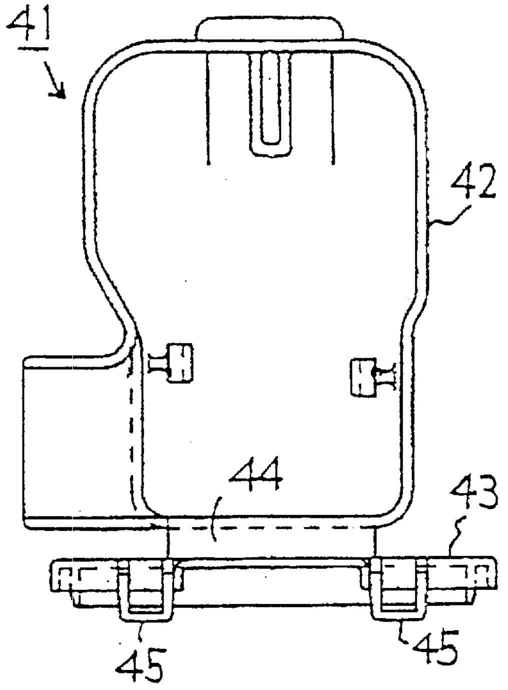
FIG.6 (e)
FIG.7
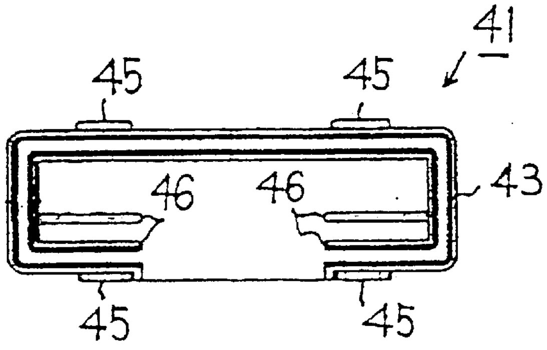

FUSE UNIT AND MANUFACTURING METHOD THEREFOR

CROSS-REFERENCE TO RELATED APPLICATIONS

This application is a division of U.S. patent application Ser. No. 09/726,335, filed Dec. 1, 2000, the contents of which are expressly incorporated by reference herein in its entirety.

BACKGROUND OF THE INVENTION

1. Field of the Invention

The present invention generally pertains to fuse units and their manufacturing method. It further relates to a fuse box, with a fuse cover, adapted to contain the fuse unit. Such a fuse box can be suitably used in vehicles, e.g. automobiles.

2. Description of Background Information

FIG. 1 shows an example of a known fuse box unit which is directly connectable to a battery. A fuse box unit 61 comprises a fuse box 62, flat fuses 63 and other components. The flat fuses 63 are formed by stamping out an electrically conductive metal plate or sheet. Each flat fuse 63 includes a fuse element portion 64 formed in a curved plane and interposed between two ear portions 65 having a respective ear hole for bolting. The fuse element portion 64 is fusible, and its width is set as a function of the current required to be passed. The fuse box 62 is made of a resin, and includes a plurality of enclosures 66 which can contain the corresponding number of flat fuses 63. A pair of flat nuts (first flat nut 67 and second flat nut 68) is insert-molded on the base of each enclosure 66. The first flat nut 67, which is used for power input, has a first flat nut hole for bolting. From this first flat nut 67 extends a terminal directly connectable to a battery (not shown in the figures). Accordingly, a flat fuse 63 is installed and a bolt 69 can be screwed into the ear hole and the first flat nut hole, so that a first end of the flat fuse 63 is connected and fixed to the first flat nut 67 at the power input side. Likewise, the second flat nut 68 has a second flat nut hole for bolting at a power output side. Accordingly, the flat fuse 63 is fixed by screwing down a bolt 69 into the second flat nut hole, so that the other end of the flat fuse 63 is connected to the second flat nut 68 at the power output side.

Electrical cables 71 constituting a wire harness 70 are crimped respectively with an ring terminal 72. These ring terminals 72 are connected and fixed to the second flat nuts 68, together with the flat fuses 63, through the bolts 69. The fuse box 62 is then protected by placing a fuse cover 73 thereon.

However, when a fuse element portion 64 is to be made narrower than a usual size, it tends to curve or bend, and the flat fuse 63 produced therefrom cannot be provided with sufficient mechanical strength. Moreover, it is difficult to manufacture a flat fuse 63 having a small electrical current capacity.

Further, assembling various components into a fuse box unit 61 requires cumbersome work steps, such as a step of fixing a plurality of flat fuses 63 into a fuse box 62 by means of bolts 69 and first and second flat nuts 67 and 68. As a consequence, the prior art fuse box unit has a quite low operation efficiency when mounted.

Furthermore, a prior art fuse box unit 61 must sometimes be constructed by using flat fuses 63 having different current ratings. In such a case, fuse element portions 64 having different widths must be prepared as a function of their current capacity. As a result, several kinds of dies have to be used for stamping, incurring additional production costs.

The present invention was contemplated in the light of the above problems. A first object of the invention is to provide a method of manufacturing a fuse unit in an easy and economical way, irrespective of the current capacity rating required and the number of fuse element portions.

A second object of the invention is to provide a fuse unit which can be manufactured easily at a low cost according to the above method, which fuse unit is endowed with a sufficient mechanical strength and can be fixed easily into a fuse recipient, e.g. a fuse box.

SUMMARY OF THE INVENTION

To this end, there is provided a method of forming a fuse unit including an electrically conductive plate having an input terminal, at least one output terminal and at least one fuse element portion linking the input terminal and the at least one output terminals. The fuse unit further includes an insulator material. The method includes stamping the electrically conductive plate so as to form the input terminal and the at least one output terminal, providing at least one locus predetermined for forming the at least one fuse element portion, molding all or part of an area including the at least one locus with the insulator material, and forming the at least one fuse element portion at the at least one locus.

Preferably, the molding includes includes molding a part of the area, such that at least one non-shielded portion is formed for the at least one locus.

Suitably, the molding includes insert-molding a part of the area by means of a die including at least one protrusion, so that the at least one protrusion forms the non-shielded portion.

Preferably yet, the stamping includes stamping the electrically conductive plate so as to form the input terminal, the at least one output terminal having a respective end portion, and at least one tie bar linking the end portions of the at least one output terminal.

Further yet, the forming may include stamping the at least one locus so as to yield the at least one fuse element portion, while simultaneously removing the at least one tie bar by the stamping.

The present invention further relates to a fuse unit including an electrically conductive plate having an input terminal, at least one output terminal and at least one fuse element portion linking the input terminal and the at least one output terminal. The fuse unit further includes an area molded with an insulator material, the area including at least one opening, through which the at least one fuse element portion is exposed to outside the insulator material.

The present invention also concerns a fuse box containing a fuse unit, the fuse unit including an electrically conductive plate having an input terminal, at least one output terminal and at least one fuse element portion linking the at least one input terminal and the at least one output terminal. The fuse unit further includes an area molded with an insulator material, the area including at least one opening, through which the at least one fuse element portion is exposed to outside the insulator material.

The fuse box is configured to have a hollow generally tubular shape having a substantially rectangular cross-section, and a top opening and a bottom opening. The fuse box contains at least one partition wall extending in the longitudinal direction of the tubular shape, thereby forming several enclosures housing the output terminals. The partition walls include a slit extending from the top opening to half-way down in the longitudinal direction, and the slits house the insulator material such that the input terminal extends perpendicularly to the longitudinal direction from the top opening.

The fuse box may further include a fuse cover including a cover plate and a cover joint, the cover plate covering the input terminal of the fuse unit and the cover joint covering the top opening of the fuse box.

In an aspect of the present invention, when the fuse element portion is being built, the peripheral area around it is already reinforced by the insulator material. Accordingly, even when a thin fuse element portion must be formed, the stress, which may cause curving or bending of the fuse element, is minimally exerted towards the fuse element portion. The fuse element portion can thus be rendered less liable to deformation or breaking, and is secured with sufficient strength. Further, even when the fuse element portion must be given a small electrical current rating, it can be formed relatively easily. Further yet, several fuse element portions having a different thickness can be formed using only one kind of die. Costs incurred for die preparation can thus be reduced to minimum, and the fuse units can thus be produced at low cost.

In another aspect of the invention, the end portions of the output terminals are linked to each other by tie bars. By virtue of this configuration, the relative positions of the output terminals are kept constant, up to a time when the fuse element portions are formed by stamping. Further, it is more difficult to exert curving- or bending-inducing stress on the fuse element portion. As a result, the fuse element portion is securely prevented from deformation or breaking.

Further, the tie bars are removed by stamping at the same time the fuse element portion is formed. The number of operation steps, as a whole, can thus be kept to a minimum, leading to improved production efficiency.

When the loci exposing through the window portions are stamped out, the insulator material does not impede the stamping work, which is thus greatly facilitated. In such a case, even when the insulator material used is not sufficiently elastic, the generation of cracks is nonetheless prevented.

In a further aspect of the present invention, as the fuse element portion is exposed through the window portion, the former can be inspected visually, irrespective of the insulator material used. Moreover, such a fuse unit can be constructed easily and economically when the above-mentioned method is applied.

BRIEF DESCRIPTION OF THE DRAWINGS

The above and the other objects, features and advantages of the present invention will be made apparent from the following description of the preferred embodiments, given as non-limiting examples, with reference to the accompanying drawings, in which:

FIGS. 2(*a*), (*b*), (*c*) and (*d*) are, respectively, a top plan view, a front elevational view, a side elevational view and a rear elevational view of a fuse unit according to the present invention;

FIGS. 4(*a*), (*b*), (*c*) and (*d*) are, respectively, a top plan view, a front elevational view, a side elevational view and a rear elevational view of a fuse box according to the present invention;

FIG. 7 is a view of the base face of the fuse cover of FIG. 6; and

DETAILED DESCRIPTION OF THE PREFERRED EMBODIMENTS

Figure 1:
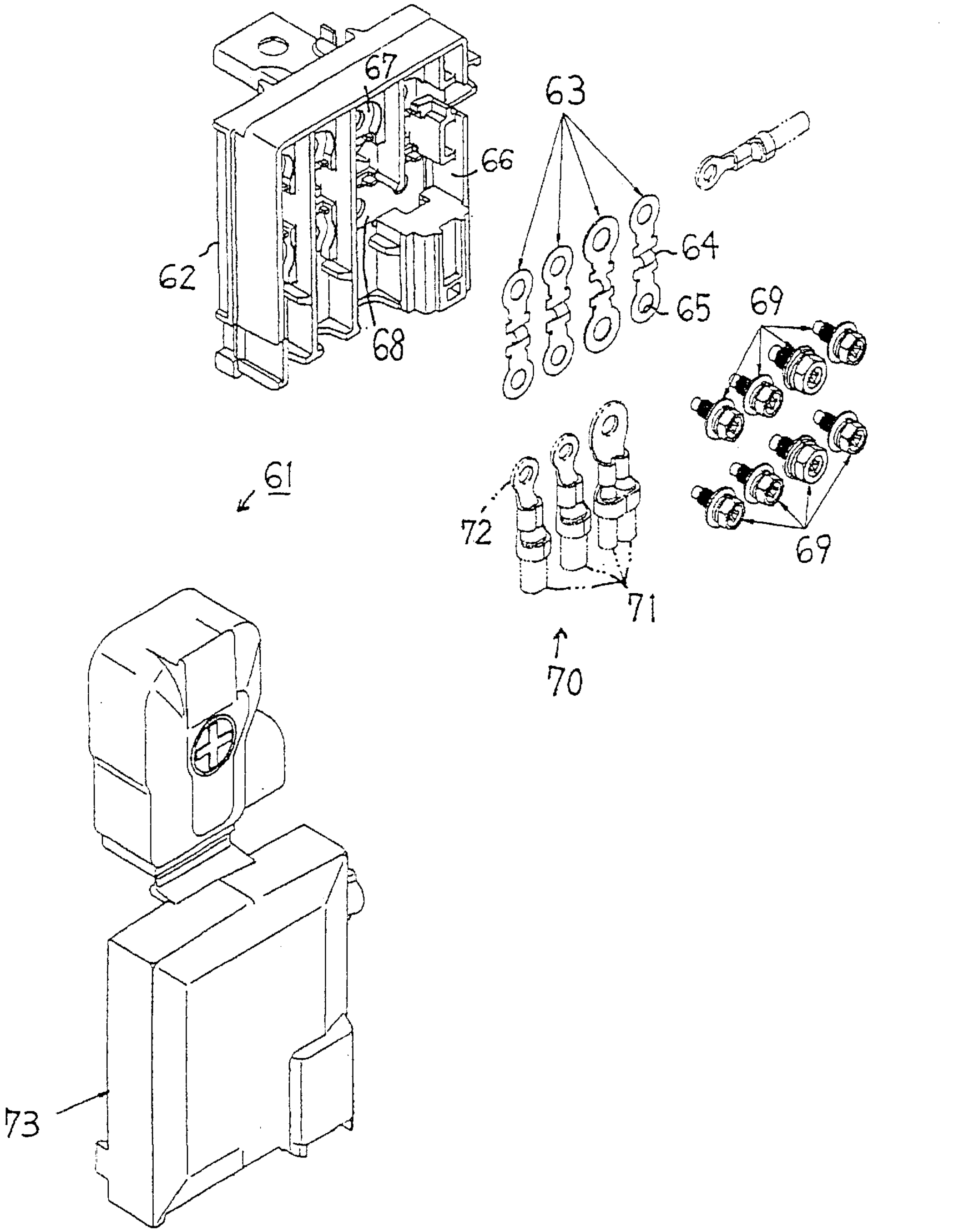
FIG.1 PRIOR ART
FIG. 1 is a perspective view of a disassembled fuse box known in the prior art.

FIGS. 2 to 8 show a fuse unit 1 used in automobiles, according to an embodiment of the present invention.

As shown in FIG. 2, the fuse unit 1 is formed by incorporating an electrically conductive plate 2, e.g. a metal plate. The conductive metal plate 2 is formed, for example, from a material made of silver, copper, zinc, tin, lead, or an alloy formed of at least one of these metals. The conductive metal plate 2 is then formed into an input terminal 3, one or several output terminals 4 (also known as "male tabs 4") and one or several fuse element portions 5. The input terminal 3 can be directly connected to a power-supply terminal for a battery mounted in an automobile (not shown in the figures). This input terminal can therefore be qualified as a terminal directly connectable to a battery. The input terminal 3 includes a first strip portion 3*a* (usually placed upright during use), and a second strip portion 3*b* (usually placed horizontally during use) which is narrower than the first strip portion 3*a* and arranged perpendicularly thereto. A first end (left-hand side in FIG. 2(*c*)) of the second strip portion 3*b* is linked to a first end (top side in FIG. 2(*c*)) of the first strip portion 3*a*. The second strip portion 3*b* is configured so as to form a cross-section having an inverted U-shape (see top portion of FIG. 2(*d*)). A through hole 6 for bolt insertion is provided in the second strip portion 3*b*. It is placed at a half-way point widthwise and near a second end of the second strip portion 3*b*, distal to the first end thereof (see FIG. 2(*b*), in which the second strip portion 3*b* is shown in the upright position). The input terminal 3 is fixed to the power-supply terminal by fitting a bolt into the through hole 6 and a nut.

The fuse unit 1 according to the present embodiment includes several units of male tabs 4 and corresponding fuse element portions 5. An example of the invention shown in FIG. 2 contains four such units. Each fuse element portion 5 contained in the corresponding fuse unit 1 is made substantially narrower than the male tab 4, and is wound into substantially a S-shaped configuration. A first end of each fuse element portion 5 leads to the first end of the second strip portion 3*b*. A second end of the fuse element portion 5 leads to a first end (upper end in FIG. 2(*b*)) of the male tab 4, which extends in a vertical direction in the same figure. The input terminal 3 is thus connected to each male tab 4 through each fuse element portion 5.

A peripheral area of the fuse element portion 5 including the latter (which is formed in a conductive metal plate 2) is molded with an insulator material, such as a resin. Such a peripheral area may cover the first strip portion 3*a* as a whole, and a top end portion of the male tab 4. The molded resin portion 7 thus produced may form a thin plate.

Typically, such an insulator resin includes an epoxy resin. The molded resin portion 7 preferably includes four window portions 8 at predetermined positions. The window portions 8 may have a substantially square shape, as shown in FIG. 2. Through these window portion 8 each fuse element portion 5 is exposed to the outside. The fuse unit 1 of the present embodiment shown in FIG. 2 is therefore in the form of a rake or fork. In this embodiment, one input terminal 3 branches into four male tabs 4.

Figure 3:
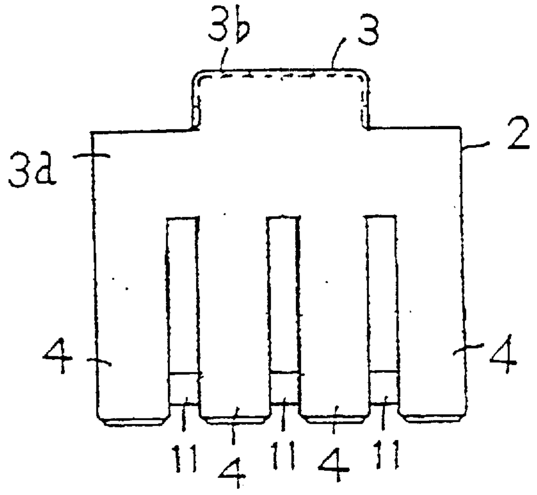
FIGS. 3(*a*), (*b*) and (*c*) are, respectively, front elevational views of the present invention fuse unit of the present invention, explaining how the fuse unit is manufactured.
Figure 3:
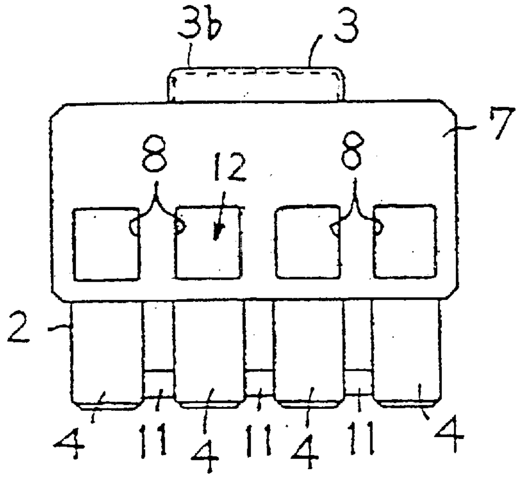
Figure 3:
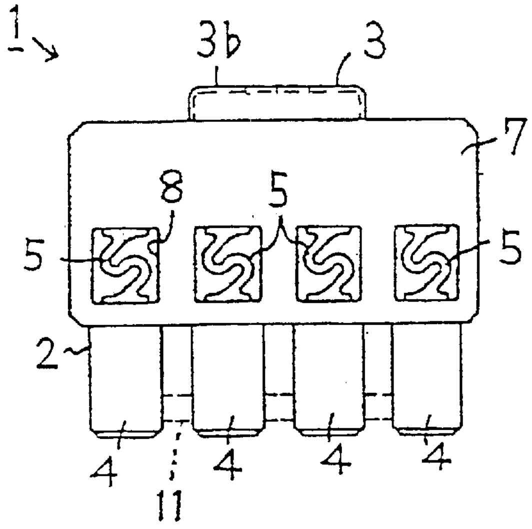
Figure 5:
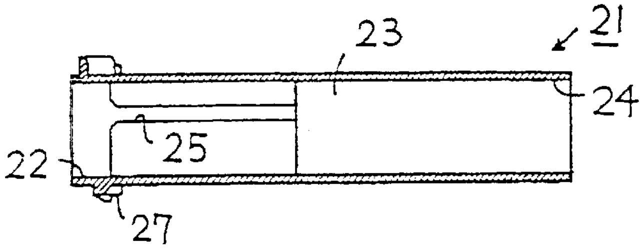
FIGS. 5(*a*), (*b*) and (*c*) are views taken in the directions along, respectively, the cross-section line A—A of the fuse box of FIG. 4(*a*), the cross-section line B—B of the fuse box of FIG. 4, and the cross-section line C—C of the fuse box of FIG. 4(*b*)
Figure 5:
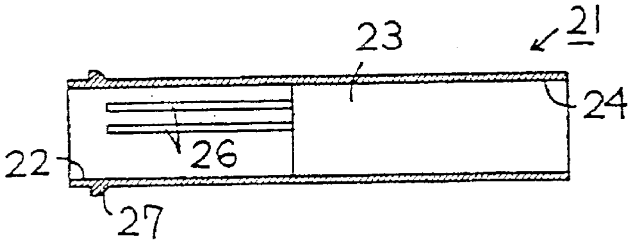
Figure 5:
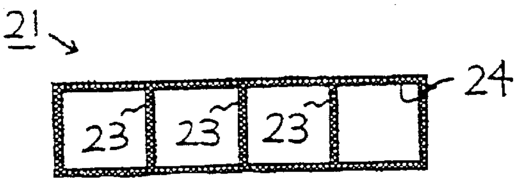

The fuse unit 1 is manufactured according to the order shown in FIG. 3(*a*), (*b*) and (*c*). First, there is provided an initial electrically conductive plate 2. The conductive plate 2 is then stamped out to yield, integrally, an input terminal 3, four male tabs 4 and corresponding tie bars 11. The tie bars 11 may have the same thickness as the conductive metal plate 2, but they may also be made thinner by, for example, half-etching. Preferably, each tie bar 11 is formed at a position not covered by the molded resin portion 7, i.e. at a lower end portion of the male tab 4. Further, a through hole 6 for bolting (see FIG. 2(*a*)) may be formed at the same time as the metal plate 2 is stamped out.

The transformed conductive plate 2 is then bent into a piece having a side cross-section of substantially L-shaped configuration, using a specific bending tool. An area including loci intended for subsequently housing fuse element portions 5 (fuse-forming loci 12) is insert-molded in a suitable way with an insulator resin, so as to form a molded resin portion 7. In a preferred embodiment, the insert-molding is effected so as to form window portions 8. In such a case, only the fuse-forming loci 12, intended for housing the fuse element portions 5, are exposed to the outside through the window portions 8. In order to reserve room for window portions 8 in the molded resin portion 7, the insert-molding die may be provided e.g. with a convexity corresponding to the window portions 8.

The exposed fuse-forming loci 12 are then formed into four fuse element portions 5 by stamping, while the three tie bars 11 are removed by the same stamping operation. The male tabs 4 are thus separated from each other to form a desired fuse unit 1 shown in FIG. 2.

The fuse unit 1 thus produced is inserted into a fuse box 21 shown in FIGS. 4(*a*)–(*d*), prior to use. The fuse box 21 is formed of any suitable insulating material, for example by molding, and has a generally rectangular tubular shape, with top and bottom ends open. A top opening 22 and a bottom opening 24 thus have a rectangular surface, respectively. The outside rim portion of the top opening 22 is provided with a plurality of stoppers 27 and a flat fixture portion 28. The inside space of the fuse box 21 is separated into four enclosures by three insulator partition walls 23. The top and bottom openings 22 and 24 of the fuse box 21 are therefore defined by four square areas. The four enclosures form four spaces for containing terminals (not shown in the figures) to be press-fitted to an electrical cable. Preferably, a portion of the inner face of fuse box 21, which inner face defines each of the four enclosures, is provided with a lance structure in order to hang the terminal therein. The other end of the terminal is press-fitted with a corresponding electrical cable which will constitute a wire harness.

A top portion of each partition wall 23 is provided with a slit 25 which extends vertically from the top to a point about half-way down. The slits 25 have the same width for all the enclosures. The width of the slit 25 corresponds to the thickness of the molded resin portion 7 of the fuse unit 1, so that the fuse unit 1 is fixed in the fuse box 21 by inserting the molded resin portion 7 into the slit 25 (see FIGS. 8(*a*)–(*c*)). Two opposing positions on the smaller inner surfaces of the fuse box 21, which correspond to the cross points with a plane passing through the slits 25, are provided with a pair of guiding ribs 26, respectively. The two guiding ribs 26 of the same pair parallel to each other, from the top of the fuse box 21 to a point about half-way down. The distance between the two guiding ribs 26 is arranged to correspond substantially to the thickness of the molded resin portion 7 of the fuse unit 1. Accordingly, when the fuse unit 1 is inserted into the fuse box 21, the two end edges of the molded resin portion 7 are held by the two pairs of guiding ribs 26 (see FIG. 8(*a*)).

Figure 6:
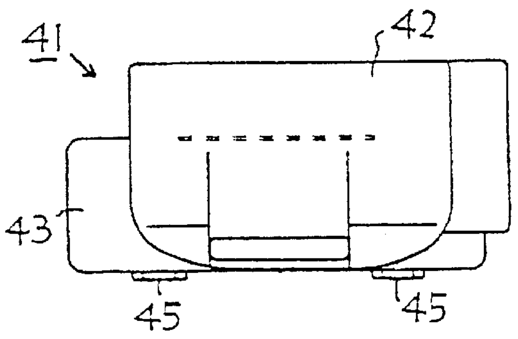
FIGS. 6(*a*), (*b*), (*c*), (*d*) and (*e*) show a fuse cover, seen respectively from, a top plan view, a front elevational view, a cross-sectional view along line D—D of FIG. 6(*b*), a side elevational view and a rear elevational view.
Figure 6:
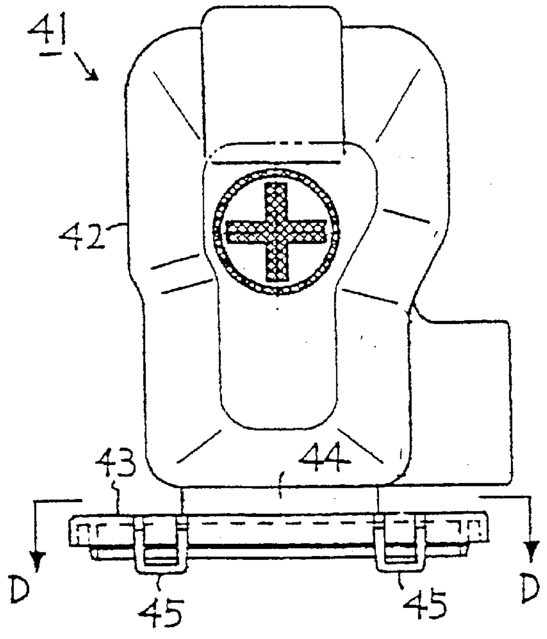
Figure 6:
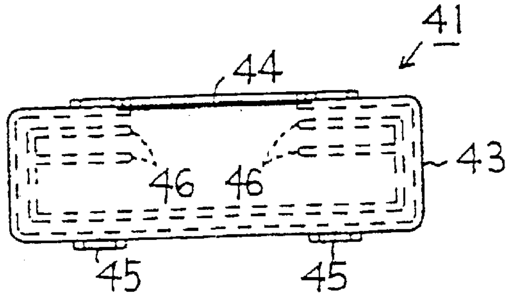
Figure 8:
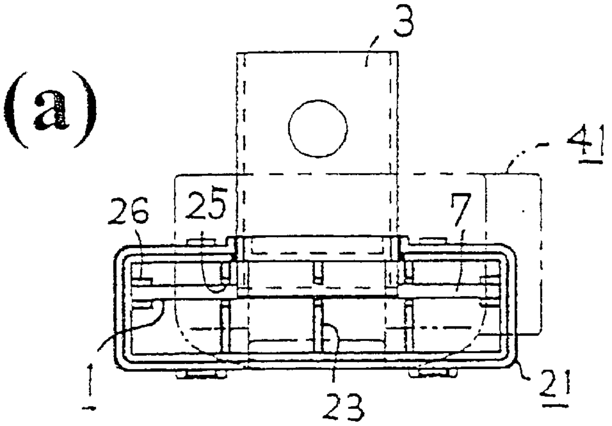
FIGS. 8(*a*), (*b*) and (*c*) are views of the fuse unit when contained in the fuse box, shown respectively by, a top plan view, a front elevational view and a side elevational view.
Figure 8:
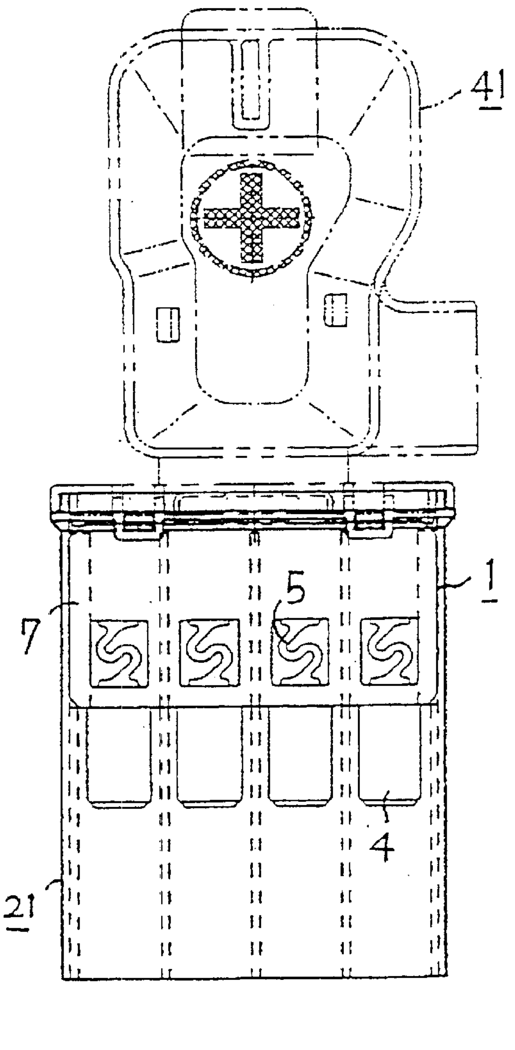
Figure 8:
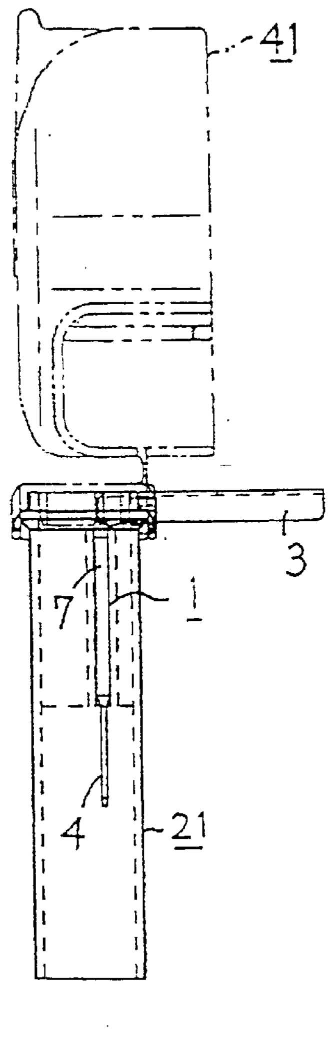

FIGS. 6 and 7 show a fuse cover 41 for protecting the fuse unit 1. The fuse cover 41 is made of any suitable insulator material, e.g. a resin. The fuse cover 41 includes a cover plate 42, a cover joint 43 and a hinge portion 44 connecting the cover plate to the cover joint. The cover plate 42 covers and protects the power-supply terminal for a battery mounted e.g. in an automobile. The outer side face of the top of the cover plate 42 is marked with an indication to caution that it encloses a power-supply terminal. The cover joint 43 is mounted so as to close the top opening 22 of the fuse box 21. The cover joint 43 includes hooking devices 45 that are formed unitarily and in one piece with the cover joint at positions corresponding to those of the stopper means 27.

Accordingly, when the fuse cover 41 is placed on the fuse box 21, the hooking device 45 are hooked to the stoppers 27. The cover joint 43 is thus securely fixed onto the top opening 22 of the fuse box 21.

There are provided two pairs of cover guiding ribs 46 on the rear face the cover joint 43. The distance between the cover guiding ribs 46 is designed to be substantially the same as the thickness of the molded resin portion 7 of the fuse unit 1. Accordingly, when the fuse unit 1 is installed and the fuse cover 41 is mounted, two end edges of the molded resin portion 7 are held by the two pairs of cover guiding ribs 46.

According to a manufacturing method of the present invention, when fuse element portions 5 are being formed, the peripheral area of the element-forming loci 12 (intended to form the fuse element portions 5) is already reinforced with a molded resin portion 7. By virtue of this structure, even when narrow fuse element portions 5 are to be formed, they are less susceptible to stress which may otherwise cause curving or bending of the fuse elements. In other words, the fuse element portions 5 are more resistant to deformation or breaking, and maintain an appropriate strength during their manufacture. As a result, the fuse unit 1, however small the electric capacity is, can be manufactured relatively easily.

According to a method of the invention, four fuse element portions 5 having different widths can be formed easily with only one stamping die. Costs incurred for preparing dies can thus be reduced to a minimum. As a consequence, the fuse units 1 and the entire assemblies containing these fuse units 1 can be produced at low costs.

According to the present manufacturing method, the end portions of adjacent male tabs 4 are initially linked to each other by tie bars 11. The structurally strengthening effect of this construction ensures that the mutual positions of the male tabs 4 are properly maintained, up to a time when the fuse element portions 5 are formed by stamping. In addition, as mentioned above, the fuse element portions 5 are protected from stress which may cause a curving or bending of the fuse elements. The fuse element portions 5 are thus less prone to deformation and breaking.

As has been understood from the above, the tie bars 11 can be removed at the same time the fuse element portions 5 are formed. The presence of the tie bars 11 does therefore not increase the operation steps as a whole, while enabling the fuses units 1 to be manufactured easily and efficiently.

Furthermore, since the stamping operation is effected on the loci exposed through the window portions 8, the molded resin portion 7 does not impede such operation. The fuse element portions 5 can thus be formed very easily.

In the past, a plurality of individually manufactured fuse elements were fixed to a fuse unit. By comparison, according to the inventive fuse unit 1, four male tabs 4 and four fuse element portions 5 are formed in a same piece of conductive metal plate 2. This construction obviates the need for a number of nuts and bolts, typically used for fixing the fuse element portions into a fuse unit 1, as well as for fixing the fuse unit 1 into a fuse box 21. Operators are thus freed from tedious operations of screwing bolts into nuts. In addition, fixing the fuse unit 1 into the fuse box 21 can be done much more easily than in the past.

In the inventive fuse unit 1, the peripheral area of the fuse element portions 5, which tends to be mechanically weak, is protected by a molded resin portion 7, so that the fuse unit 1 itself provides sufficient mechanical strength. In such construction, even if the fuse element portions 5 are rendered thin and narrow, they are not susceptible to deformation as such. Furthermore, the presence of the molded resin portion 7 makes the fuse unit 1 more waterproof.

Further, in the fuse unit 1 of the invention, the fuse element portion 5 is constantly exposed to the outside through the window portion 8. The fuse element portion 5 can thus be visually inspected, irrespective of the material used for the molded resin portion 7. For example, when the fuse element portion 5 is fused by the passage of an excessive current, this condition is easily detected by human eye.

The structure of the fuse unit 1 may be modified very easily, so as to produce variant embodiments as follows.

The number of male tabs 4 used as output terminals is not limited to four, exemplified in the above embodiment. It may be one, two or three. It may also be more than four. The form of male tabs 4 may also be modified as desired.

Likewise, the input terminal 3 may have a configuration other than the one described above, or may not include the through hole 6 for bolting.

When only one male tab 4 is provided, the number of fuse element portions 5 may also be reduced to one. Moreover, the number of fuse element portions 5 may correspond to the number of male tabs 4.

The insulator material used is not limited to the above-mentioned molded resin portion 7, but may be any suitable material, e.g., rubber. Likewise, the insulator material may be formed according to a method other than insert-molding.

When a rubber material is used as insulator material, a fuse element portion 5 can be formed by stamping, without forming the window portion 8. One reason for allowing such a formation operation is that, as rubber is a good elastic material, little stress forms inside the rubber, and consequently no crack will be formed through such operation.

As mentioned above, the tie bars 11 may be removed at the same time as the fuse element portion 5 is formed by stamping. But they may also be eliminated in a separate process. Moreover, when the fuse element portion 5 risks no deformation or breaking, the use of tie bars 11 may not be required.

Instead of stamping, the fuse element portion 5 may also be formed by e.g. etching.

The window portion 8 may be in a form other than a rectangular form, e.g. a circular or triangular form. The window portion 8 may also be one single large unit including a plurality of fuse-forming loci 12, thereby forming one common window portion 8.

Further advantages of the present invention will be made apparent from the following description of the technical concepts on which the present invention is based.

Firstly, the input terminal of the present invention can be connected directly to a power-supply terminal of batteries.

Secondly, the input terminal of the invention can be used for the power-supply terminal for batteries in an automobile.

Thirdly, each of the output terminals may be in the form of a male tab, which can be connected to a press-fixing terminal provided in a wire harness. According to this construction, the fuse unit can be connected to a wire harness in a very secured way.

Fourthly, the fuse unit may be substantially in the shape of a rake or fork.

Fifthly, the input terminal may be provided with a bolt hole, which may not be covered with the insulator material. By fixing with bolts, the input terminal can be fixed to the power-supply means in a more secure manner.

Sixthly, the tie bars may be rendered thinner than the electrically conductive plate. The tie bars are thus very easily stamped away.

Seventhly, the tie bars may be formed outside the area where the insulator material is coated. The tie bars can thus be eliminated, without removing the insulator material.

Eighthly, the input terminal and the output terminals are first formed with the electrically conductive plate. An area of the conductive plate including the loci, where the fuse element portions should be formed later, is then molded with an insulator material. These loci for fuse element are subsequently transformed into fuse element portions. Accordingly, irrespective of their thickness, the fuse element portions can be formed at a predetermined position, in an easy and economical way.

Ninthly, an area portion of the electrically conductive plate (which may include an input terminal, several output terminals and several fuse element portions linking them) is molded with an insulator material. In addition, the insulator material is provided with window portions, through which the fuse element portions are exposed to the outside. Thus, the fuse unit can be constructed easily and at a low cost. Further, the fuse unit obtained has sufficient mechanical strength, and can be easily mounted into a fuse box. Furthermore, the fuse element portions can be inspected by direct observation.

A main advantage of the invention is that the fuse unit is manufactured in a easy and economical way, irrespective of the current capacity and number of the fuse element portions.

A further advantage exists in the fact that the fuse element portions are protected from deformation or breaking while manufacturing the fuse unit.

Another advantage is that, in a preferred embodiment, the fuse element portions can be inspected through a direct visual observation.

Although the invention has been described with reference to particular means, materials and embodiments, it is to be understood that the invention is not limited to the particulars disclosed and extends to all equivalents within the scope of the claims.

The present disclosure relates to subject matter contained in priority Japanese Application No. HEI 11-345350, filed on Dec. 3, 1999, which is herein expressly incorporated by reference in its entirety.

What is claimed:

1. A fuse box containing a fuse unit, said fuse unit comprising an electrically conductive plate including an input terminal, at least one output terminal and at least one fuse element portion linking said input terminal and said at least one output terminal, said fuse unit further comprising an area molded with an insulator material, said area including at least one opening through which said at least one fuse element portion is exposed to an outside of said insulator material;

said fuse box configured to have a hollow tubular shape having a substantially rectangular cross-section, and a top opening and a bottom opening, said fuse box containing at least one partition wall extending in the longitudinal direction of said tubular shape, thereby forming several enclosures, each housing one of said at least one output terminal, said at least one partition wall including a slit extending from said top opening to a point half-way down in said longitudinal direction, said at least one slit housing said insulator material such that said input terminal extends perpendicularly to said longitudinal direction from said top opening.

2. The fuse box according to claim 1, further comprising a fuse cover including a cover plate and a cover joint, said cover plate covering said input terminal of said fuse unit and said cover joint covering said top opening of said fuse box.

* * * * *

UNITED STATES PATENT AND TRADEMARK OFFICE

CERTIFICATE OF CORRECTION

PATENT NO. : 6,580,032 B2
DATED : June 17, 2003
INVENTOR(S) : Tatsuya Sumida et al.

It is certified that error appears in the above-identified patent and that said Letters Patent is hereby corrected as shown below:

Title page,
Item [56], References Cited, U.S. PATENT DOCUMENTS, should be included:

| | | | |
|---|---|---|---|
| -- 4,056,884 | 11-1977 | Williamson et al. | 29/623 |
| 6,067,004 | 05-2000 | Hibayashi et al. | 337/186 |
| 6,275,135 | 08-2001 | Hibayashi et al. | 337/186 |
| 5,841,388 | 11-1998 | Yasuda et al. | 341/118 |
| 5,346,411 | 09-1994 | Nikkinen | 337/255 |
| 5,783,985 | 07-1998 | Kowalik et al. | 337/227 |
| 6,111,758 | 08-2000 | Dowd, Doyle N. | 174/52.1 |
| 4,531,806 | 08-2001 | Hibayashi et al. | 337/227 -- |

Signed and Sealed this

Twenty-fourth Day of February, 2004

JON W. DUDAS
*Acting Director of the United States Patent and Trademark Office*